Figures 1, 2:
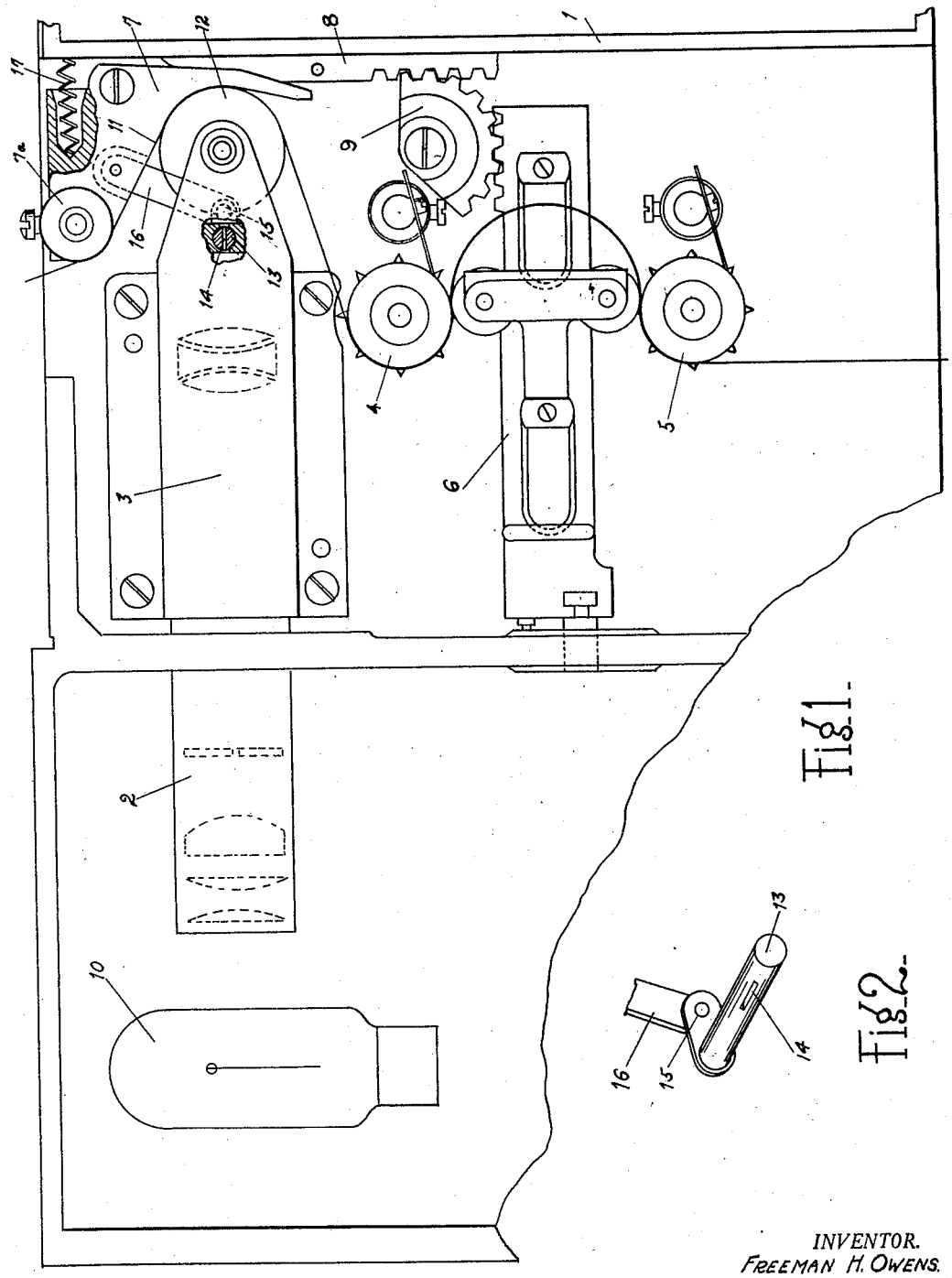

Nov. 24, 1931.  F. H. OWENS  1,833,370

PHOTOGRAPHIC SOUND REPRODUCING APPARATUS

Filed June 18, 1929

INVENTOR.
FREEMAN H. OWENS.
BY Philip S. Hopkins
ATTORNEY

Patented Nov. 24, 1931

1,833,370

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

PHOTOGRAPHIC SOUND REPRODUCING APPARATUS

Application filed June 18, 1929. Serial No. 371,809.

This invention relates to photographic sound recording and reproducing apparatus, the principal object of the invention being to produce means for automatically preventing the passage of light to or through the photographic film upon which the sound is to be or has been recorded, in case of the breakage of the film during operation of the apparatus.

Another object of my invention is to provide a safety device of the character above indicated which also normally acts as a film tension device.

Other objects and advantages of the invention will appear as the description proceeds.

In the drawings accompanying this specification,

Figure 1 is a partly sectional side view of an apparatus embodying the features of the present invention; and Figure 2 is a detail view of the shutter and its operating mechanism.

The same characters of reference designate the same parts in both figures of the drawings.

Although I have shown and will describe my invention as applied to a sound reproducing apparatus, it will be apparent that it is equally adaptable to a sound recording device.

Referring to the drawings, 1 designates a housing, within which are disposed a lens assembly 2 and a roller film support housing 3 similar to those described and claimed in my copending application, Serial No. 360,871, filed May 6, 1929. Within the housing 1 is also disposed the loop-forming and threading mechanism comprising the sprockets 4 and 5, slide 6, tensioning lever 7, lever operating slide 8 and segmental gear 9 for transmitting motion to said latter slide.

The present invention relates particularly to the provision of means for automatically closing the shutter which controls the opening through which the rays of light from the reproducing lamp 10 are focused on the record carrying film 11 as it passes over the roller support 12. As described in my said copending application No. 360,871, the said opening is formed in the thickened end wall of the roller support housing 3, and is fitted with a rotatable plug or rod 13, said rod having formed at one end thereof a slot 14, whereby when the rod is rotated so as to bring its slot into alignment with the opening in the housing wall, light will pass to the film, and when the rod is rocked or rotated to carry its slot out of alignment the light will be shut off from the film.

For automatically rocking the rod 13, a crank 15 is provided at one end of said rod, to which crank is pivoted one end of a link 16, the opposite end of which is pivoted to the tension lever 7, the pivotal point of the link on said lever being so related to the position of the crank 15 that when the roller 7a on the lever is in operative engagement with the film, as shown in Figure 1, the slot 14 of the rod is in exact alignment with the light opening. With the pivotal points of the link so disposed relatively to each other, if the film should break the roller-carrying arm of the lever will move downward under the tension of its spring 17, thereby pushing on the link 16 and thus rocking the rod so as to carry its slot out of alignment with the light opening.

It will be understood of course that in the normal operation of the device, the roller 7a on the spring pressed lever 7 will ride on and serve as a tension roller for the film 11, and in such position the slot 14 in the shutter permits the passage of light to the film. If the film should break however, the lever 7 will rock downwardly, thus turning the shutter rod 13 and shutting off the light to the film.

I claim:

1. In a photographic sound reproducing apparatus, a reproducing unit having an opening for the passage of light, a shutter having a narrow slit for controlling the passage of light through said opening, means for supporting a record-carrying film in the path of light passing through said opening, movable means for imparting tension to said film, and means automatically actuated by the movement of said tension means for operating said shutter to move said slit out of light passing position.

2. In a photographic sound reproducing apparatus, a reproducing unit having an opening for the passage of light, a rotatable shutter for controlling the passage of light through said opening, said shutter having a narrow slit therein, means for supporting a record-carrying film in the path of light passing through said opening, a spring-actuated lever having a roller adapted to contact with said film thereby to impart tension to the film, and a link pivotally connected to said lever and shutter whereby movement of the lever in one direction will actuate said shutter to move said slit out of light passing position.

3. A sound recording and reproducing apparatus comprising a support for a traveling film, a light passage to said film, and means controlled by said film to close said passage, said means comprising a shutter in said passage having a narrow slit therein.

4. A sound recording and reproducing apparatus comprising a support for a traveling film, a light passage to said film, a shutter in said passage having a narrow slit therein, a tension means engaging said film and connections between said tension means and said shutter whereby movement of said tension means in one direction rotates said shutter to move said slit out of light passing position.

In testimony whereof, I affix my signature.

FREEMAN H. OWENS.